(12) United States Patent
Manzanillo

(10) Patent No.: US 11,805,189 B1
(45) Date of Patent: Oct. 31, 2023

(54) PUBLISH AND SUBSCRIBE CALL CENTER ARCHITECTURE

(71) Applicant: INTRADO LIFE & SAFETY, INC., Longmont, CO (US)

(72) Inventor: Mario Manzanillo, Dollard-des-Ormeaux (CA)

(73) Assignee: Intrado Life & Safety, Inc., Longmont, CO (US)

( * ) Notice: Subject to any disclaimer, the term of this patent is extended or adjusted under 35 U.S.C. 154(b) by 39 days.

(21) Appl. No.: 17/024,657

(22) Filed: Sep. 17, 2020

(51) Int. Cl.

| | |
|---|---|
| *H04L 12/00* | (2006.01) |
| *H04L 67/562* | (2022.01) |
| *G10L 15/26* | (2006.01) |
| *G10L 15/02* | (2006.01) |
| *G06F 9/54* | (2006.01) |
| *G06F 16/68* | (2019.01) |
| *G06F 16/683* | (2019.01) |
| *G06F 16/11* | (2019.01) |
| *H04M 3/51* | (2006.01) |
| *H04M 3/42* | (2006.01) |

(52) U.S. Cl.
CPC ............ *H04L 67/562* (2022.05); *G06F 9/547* (2013.01); *G06F 16/116* (2019.01); *G06F 16/685* (2019.01); *G06F 16/686* (2019.01); *G10L 15/02* (2013.01); *G10L 15/26* (2013.01); *H04M 3/42221* (2013.01); *H04M 3/5116* (2013.01)

(58) Field of Classification Search
CPC ..... H04L 67/2809; H04L 15/08; H04L 51/04; G06F 9/547; G06F 16/116; G06F 16/685; G06F 16/686; G10L 15/02; G10L 15/26; H04W 4/18

USPC .................................................. 709/204–207
See application file for complete search history.

(56) References Cited

U.S. PATENT DOCUMENTS

| | | | | |
|---|---|---|---|---|
| 7,463,723 | B2 * | 12/2008 | Davis ................ | H04M 3/53308 379/88.16 |
| 8,805,688 | B2 * | 8/2014 | Barton .............. | H04M 3/42382 704/235 |
| 8,948,720 | B1 | 2/2015 | Chan et al. | |
| 9,124,716 | B1 * | 9/2015 | Charugundla ...... | H04M 1/7243 |
| 9,406,296 | B2 * | 8/2016 | Charugundla ..........| G06F 3/041 |
| 9,668,116 | B1 * | 5/2017 | Bonanni ................. | H04L 15/08 |
| 9,736,318 | B2 * | 8/2017 | Kaminsky .............. | H04M 11/10 |
| 9,848,087 | B2 * | 12/2017 | Moore ................ | H04M 3/5307 |
| 11,050,678 | B2 | 6/2021 | Fenske et al. | |
| 2014/0348320 | A1 * | 11/2014 | Odinak ................... | G10L 13/08 379/265.09 |
| 2015/0098561 | A1 | 4/2015 | Etison et al. | |

(Continued)

FOREIGN PATENT DOCUMENTS

| | | | | | |
|---|---|---|---|---|---|
| CN | 102047647 | B | * 11/2015 | ...... | H04M 1/274516 |
| CN | 113782026 | A | * 12/2021 | ............ | G06F 16/60 |

(Continued)

*Primary Examiner* — Frantz Coby
(74) *Attorney, Agent, or Firm* — Patent Capital Group

(57) ABSTRACT

An example operation may include one or more of receiving an audio file from a public safety answering point (PSAP), the audio file comprising a recording of a telephone call, converting the audio file into a text file that comprises a transcript of the telephone call, identifying a keyword within the text file that is associated with a topic, and transmitting a portion of the text file of the telephone call to one or more subscribers that have registered with the topic.

19 Claims, 10 Drawing Sheets

(56) References Cited

U.S. PATENT DOCUMENTS

| | | | |
|---|---|---|---|
| 2016/0080558 A1* | 3/2016 | Kim | H04W 4/18 |
| | | | 455/566 |
| 2016/0344869 A1* | 11/2016 | Patel | H04L 51/04 |
| 2017/0195139 A1* | 7/2017 | Bonanni | H04M 3/42382 |
| 2018/0293300 A1* | 10/2018 | Liu | G06F 40/289 |
| 2019/0220520 A1* | 7/2019 | Kao | H04L 67/567 |
| 2019/0258704 A1 | 8/2019 | Mertens et al. | |
| 2019/0373093 A1* | 12/2019 | Engelke | H04M 3/42391 |
| 2020/0126174 A1 | 4/2020 | Halse et al. | |
| 2020/0241817 A1* | 7/2020 | Ueno | G10L 15/26 |
| 2021/0183360 A1* | 6/2021 | Ebrahimifard | G08G 5/065 |
| 2021/0250441 A1* | 8/2021 | Gray | H04M 3/42382 |
| 2021/0357597 A1* | 11/2021 | Cholas | G06F 40/166 |

FOREIGN PATENT DOCUMENTS

| | | | | |
|---|---|---|---|---|
| EP | 3712886 A1 * | 9/2020 | | G10L 15/06 |
| EP | 3944234 A1 * | 1/2022 | | G06K 9/00718 |
| JP | 2021144156 A * | 9/2021 | | G06F 16/60 |
| KR | 2019058066 A * | 5/2019 | | G06Q 10/10 |
| KR | 2021120574 A * | 10/2021 | | G06F 16/60 |
| WO | WO-2017055879 A1 * | 4/2017 | | G06F 16/60 |

\* cited by examiner

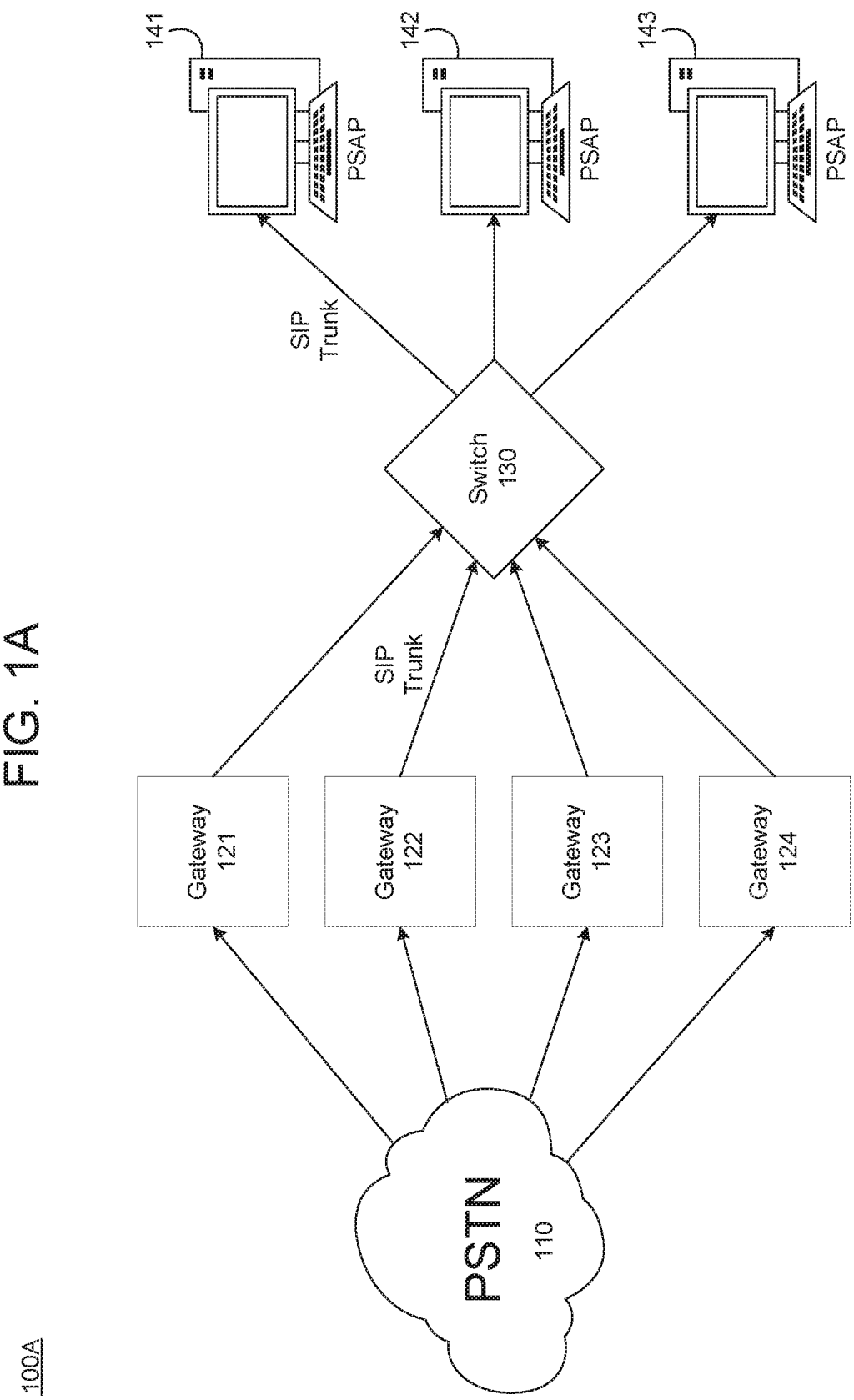

200C

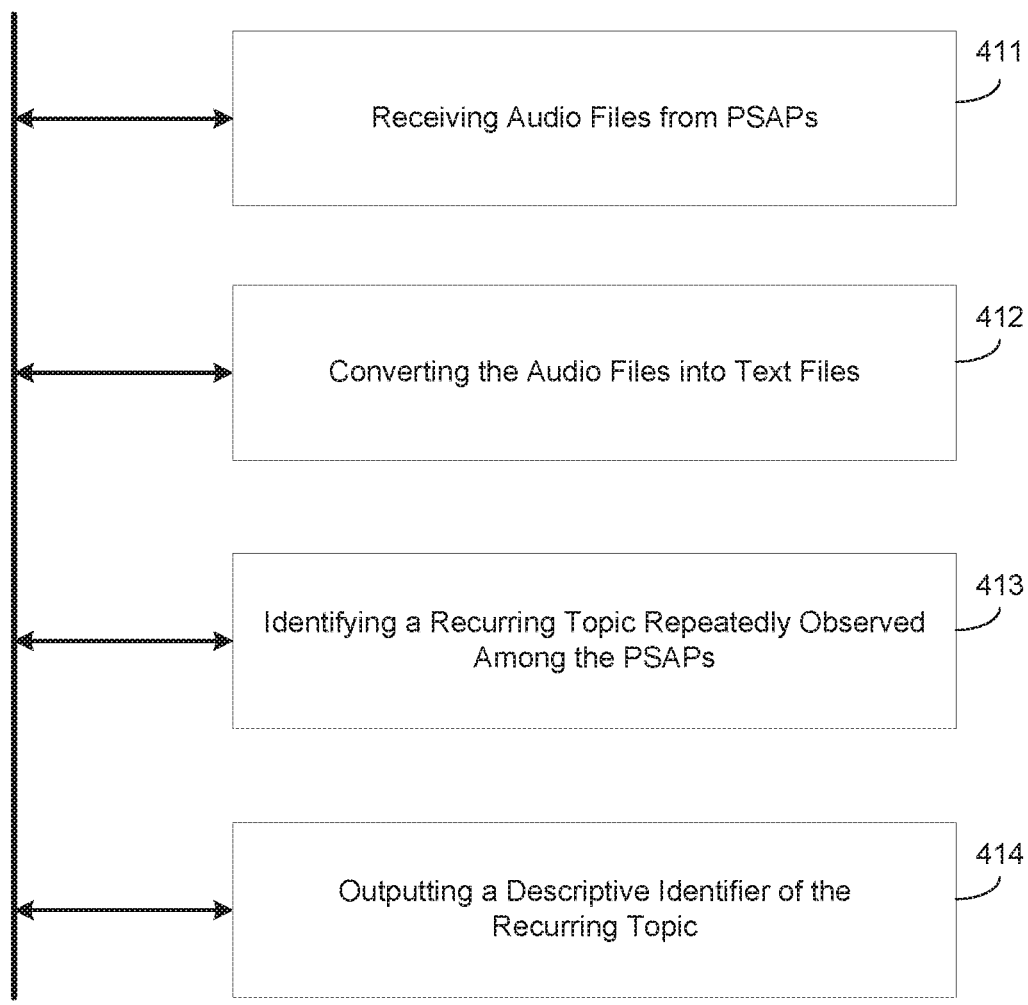

500  FIG. 5
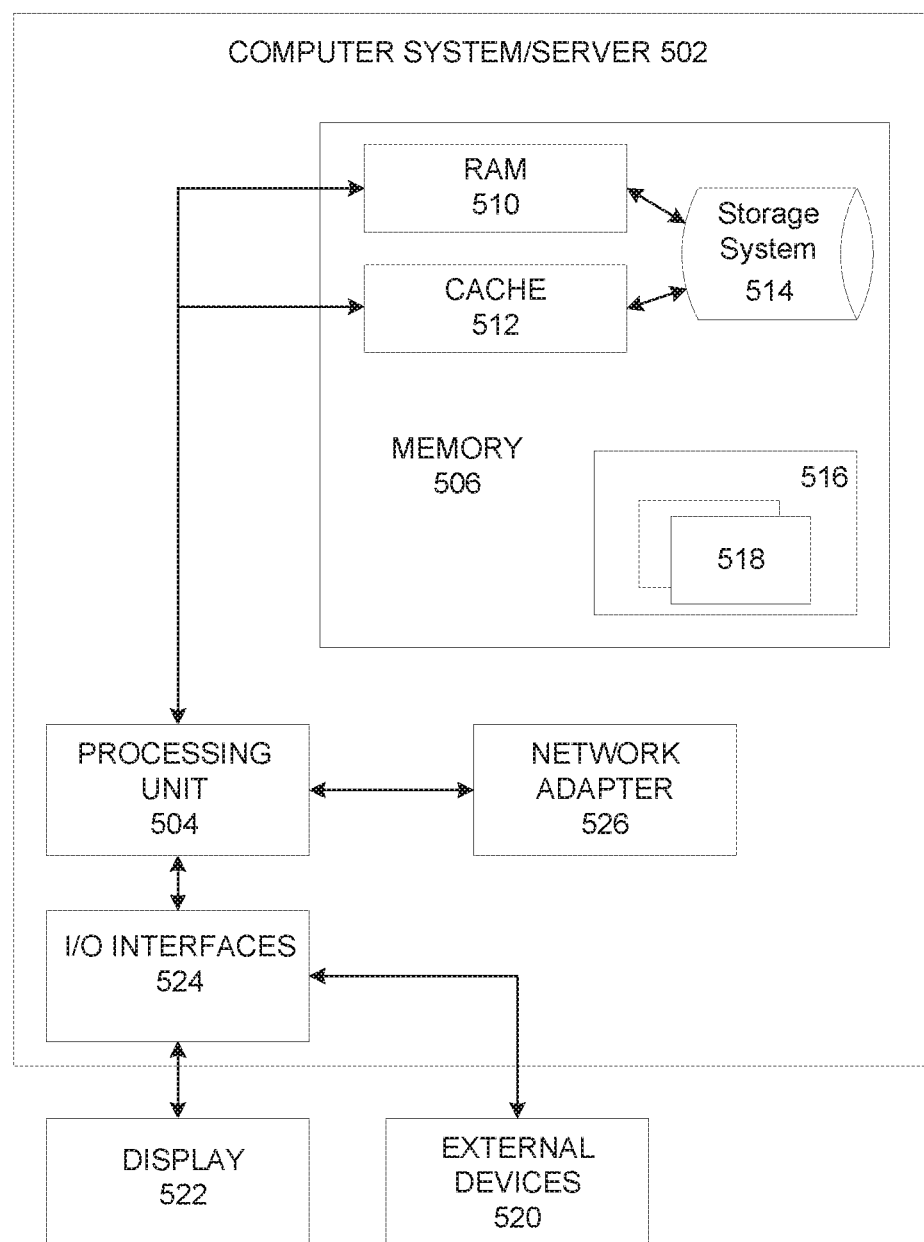

PUBLISH AND SUBSCRIBE CALL CENTER ARCHITECTURE

CROSS-REFERENCE TO RELATED APPLICATION

This application is related to co-pending U.S. non-provisional patent application Docket No. PAT-347B entitled, "INSIGHT DETERMINATION FROM AGGREGATED CALL CONTENT," both of which were filed on the same day and each incorporated herein by reference in its entirety.

BACKGROUND

A public safety answering point (PSAP), also referred to as a public safety access point, is a call station staffed to receive emergency calls (e.g., 911, 112, etc.) routed by a telephone network such as a public switched telephone network (PSTN). A PSAP is often equipped with a comprehensive range of components to meet public safety communication goals including telephone systems and controllers, workstations, mapping and radio applications, computer-aided dispatch, and the like. During operation, an emergency call routed to a PSAP may be answered by a trained official referred to as a dispatcher.

However, calls (and even text messages) into a PSAP are generally received and managed locally at the PSAP. As a result, the information included in these calls remains local with the PSAP operator. However, other systems, people, resources, etc., may have interest in the information (e.g., public safety, etc.) with these calls. Accordingly, what is needed is a mechanism by which call data can be shared externally.

SUMMARY

One example embodiment may provide an apparatus that includes one or more of a network interface configured to receive an audio file from a public safety answering point (PSAP), the audio file comprising a recording of a telephone call, and a processor configured to one or more of convert the audio file into a text file that comprises a transcript of the telephone call, identify a keyword within the audio file that is associated with a topic, and transmit a portion of the text file of the telephone call to one or more subscribers that have registered with the topic Another example embodiment may provide a method that includes one or more of receiving an audio file from a public safety answering point (PSAP), the audio file comprising a recording of a telephone call, converting the audio file into a text file that comprises a transcript of the telephone call, identifying a keyword within the audio file that is associated with a topic, and transmitting a portion of the text file of the telephone call to one or more subscribers that have registered with the topic.

Another example embodiment may provide a non-transitory computer readable medium comprising instructions, that when read by a processor, cause the processor to perform one or more of receiving an audio file from a public safety answering point (PSAP), the audio file comprising a recording of a telephone call, converting the audio file into a text file that comprises a transcript of the telephone call, identifying a keyword within the audio file that is associated with a topic, and transmitting a portion of the text file of the telephone call to one or more subscribers that have registered with the topic.

Another example embodiment may provide an apparatus that includes one or more of a network interface configured to receive audio files from public safety answering points (PSAPs), the audio files comprising recordings of telephone calls captured via the PSAPs, and a processor configured to one or more of convert, via a speech-to-text converter, the audio files into text files that comprises respective transcripts of the respective telephone calls, identify, via a reporting engine, a recurring topic that is discussed during the telephone calls from recurring text content within the text files, and output, via the reporting engine, a descriptive identifier of the recurring topic via a user interface.

Another example embodiment may provide a method that includes one or more of receiving audio files from public safety answering points (PSAPs), the audio files comprising recordings of telephone calls captured via the PSAPs, converting, via a speech-to-text converter, the audio files into text files that comprises respective transcripts of the respective telephone calls, identifying, via a reporting engine, a recurring topic that is discussed during the telephone calls from recurring text content within the text files, and outputting, via the reporting engine, a descriptive identifier of the recurring topic via a user interface.

A further example embodiment may provide a non-transitory computer readable medium comprising instructions, that when read by a processor, cause the processor to perform one or more of receiving audio files from public safety answering points (PSAPs), the audio files comprising recordings of telephone calls captured via the PSAPs, converting, via a speech-to-text converter, the audio files into text files that comprises respective transcripts of the respective telephone calls, identifying, via a reporting engine, a recurring topic that is discussed during the telephone calls from recurring text content within the text files, and outputting, via the reporting engine, a descriptive identifier of the recurring topic via a user interface.

BRIEF DESCRIPTION OF THE DRAWINGS

FIG. 1A is a diagram illustrating a telephone communication network according to example embodiments.

FIG. 4B is a diagram illustrating a method of generating insight from call content according to example embodiments.

FIG. 5 is a diagram illustrating a computer system configured to support one or more of the example embodiments.

DETAILED DESCRIPTION

Figure 1B:
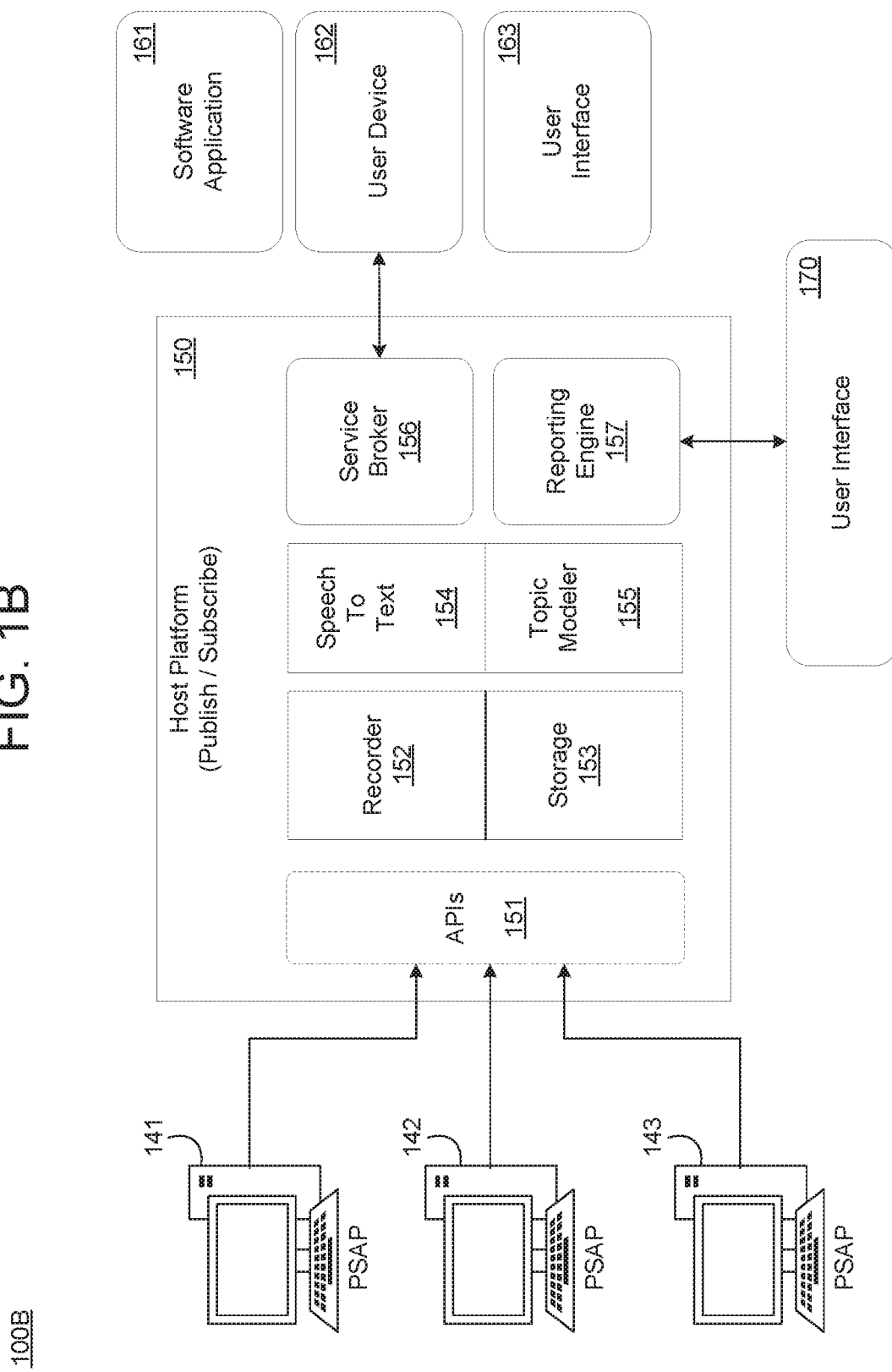
FIG. 1B is a diagram illustrating a publish and subscribe architecture according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Call content that is received by a public safety answering point (PSAP) is typically not recorded. Rather, the operator of the PSAP answers the call, listens to the speaker, and dispatches emergency services (e.g., police, fire department, hospital, etc.) if necessary. As a result, valuable call content from the PSAP is not available to others.

The example embodiments overcome these drawback by introducing a publish/subscribe architecture for PSAPs. For example, call content from a PSAP may be transmitted to a host platform of the publish/subscribe architecture (e.g., a web server, a cloud platform, etc.) which records the call content. Furthermore, the host platform may convert the recorded audio files into text, for example, via a speech-to-text converter system.

By recording call content and converting it into text files, the example embodiments open up new possibilities for PSAP data. In this architecture, other users, software applications, emergency services, etc., may subscribe to various topics and receive messages and/or other content from PSAPs that is recorded and made available by the host platform. As an example, a police department may subscribe to a specific topic (e.g., a person, a vehicle, an incident, etc.) that is of interest to the police department. Here, if any PSAP receives a call or text that observes such a topic, the police department may be notified of the occurrence and also receive a transcript or partial transcript of the call, thus providing real-time connection of the observance to the entity interested in such topic.

For example, a police department may issue a be on the look-out (BOLO) or an all-points bulletin (APB) for a topic of interest (e.g., a tall man wearing dark jeans, a red truck, a missing child, etc.). Traditionally, the police department must rely on people (e.g., emergency personal, the public, etc.) to recognize such a BOLO or APB by finding it, reading it, and comprehending it. In this case, the people can then forward any information associated therewith to the correct police department. This requires proactive efforts on behalf of humans. In contrast, in the example embodiments, the automated system can detect when a call simply mentions the topic of interest associated with the BOLO or the APB based on a recording of an audio file from a PSAP (or other station), and automatically forward the transcript (and/or a link to the call) to the police department in real-time.

According to various other embodiments, the host platform may also include a reporting engine that is capable of identifying patterns of data across multiple PSAPs, and providing insight and information to other users, applications, etc. Traditionally, PSAP data is limited to its local operator and possibly other people that are brought into the call. In contrast, by recording data from different PSAPs at the host platform, it is now possible to analyze the data as a whole via a reporting engine.

For example, the host platform may receive audio files from PSAPs (e.g., via an application programming interface (API)), convert the audio files into text, and analyze the text content for patterns. The patterns may be a result of data that is extracted or otherwise accumulated from multiple different PSAPs, rather than just a single PSAP, thereby providing a larger picture of the data. In some embodiments, the reporting engine may use statistical learning, machine learning, artificial intelligence, and the like, to identify patterns in data that is observed across multiple different PSAPs (and jurisdictions). For example, the reporting engine may identify a number of calls related to gun violence, a number of calls that are urgent emergencies versus non-emergency situations, crime statistics, ambulance calls, and the like. The reporting engine may output the identified patterns and insight associated with the patterns to a user interface, another software application, and the like.

FIG. 1A illustrates a telephone communication network 100A ("network 100A") according to example embodiments. For example, the network 100A may include a plurality of nodes that are connected to one another via a network, a combination of networks, and the like. The network and/or networks may include mobile networks, landline networks, data networks, etc. that transmit and receive calls and text messages (e.g., SMS, MMS, etc.) The nodes may include servers/gateways, routers, switches, calling devices, answering points (e.g., PSAP's), and the like. As described herein, a telephone call or simply a call may refer to a VOIP call such as a session initiate protocol (SIP) call, or the like.

Referring to FIG. 1A, a call may be placed from a mobile device, a landline, etc., and transmitted from a public switched telephone network (PSTN) 110, or the like. The call may be received by a computing terminal (e.g., gateway 112) from among a plurality of gateways 121-124 within the network 100A. The gateway 122 may convert the call from the PSTN into a VOIP call such as a SIP call, according to RFC 3261. The converted call may be transmitted from the gateway 122 to a switch 130 via the Internet. Here, the gateway may use SIP trunking to send voice or text communications to the switch 130 via the Internet. The SIP trunk may utilize a packet switch network. In this case, the gateway may break the call into digital packets (e.g., messages) that are sent across the SIP trunk to the switch 130. It should also be appreciated that other VOIP protocols may be used, instead of SIP.

The gateways 121-124 may be computing systems, such as servers, etc., that include codecs which convert the audio voice signals from the telephone call received via the PSTN 110 into digital form for transmission over the Internet. When the packets reach their destination such as the switch 130 or one of a plurality of PSAPs 141-143, the destination may convert the packets with compressed audio signals back to an uncompressed form for playing the audio/voice signal of the call. Although not shown in the example of FIG. 1A, the network 100 may include additional and/or different components such as a recorder for recording the calls, an automatic location identification (ALI) provider that provides a geographic location of the call, and which can be displayed by the receiving PSAP 141-143, used by the switch 130 for routing among the PSAP 141-143, and the like.

FIG. 1B illustrates a publish and subscribe architecture 100B according to example embodiments. Here, the architecture 100B may be an extension of and included within the network 100A shown and described with respect to FIG. 1A. Referring to FIG. 1B, a host platform 150 may implement the publish/subscribe functionality described herein. Subscribers such as one or more software applications 161, one or more user devices 162, one or more user interfaces 163, etc. may subscribe to various topics by registering with a service broker 156 of the host platform 150. Here, the subscriber may provide an identifier of a topic of interest which may include a short textual description (e.g., "blue sedan," etc.). The service broker may register an identifier of the subscriber (e.g., a device ID, username, etc.), the provided topic(s), contact information (e.g., a URL, an email address, a phone number, etc.) for publishing data related to the topic, and the like.

Meanwhile, the host platform 150 may also connect to the PSAPs 141-143 from FIG. 1A, via the communication network and receive audio files therefrom. The audio files may be streamed (in real-time) from the PSAPs 141-143 to the host platform 150 via an application programming interface (API) 151 which adds information to the stream such as a PSAP identifier, a location of the call, a timestamp, a location of the caller (e.g., an address), and the like. The host platform 150 may also include a recorder 152 which records the streamed calls and stores the recordings as audio files in the storage 153. A speech-to-text converter 154 may convert the recorded audio files into call transcripts (text files) that are also stored within the storage 153. Furthermore, a topic modeler 155 may analyze the text files to identify a topic that is associated with each text file, and store an identifier of the topic within the text file or in a management file of the storage 153 which identifies the audio file and a topic associated with the audio file. For example, the topic modeler 155 may identify an exact match (e.g., "red truck") when the topic is "red truck." As another example, the topic modeler 155 may identify non-exact matches that are still related to the topic and push those messages to the subscriber. For example, the topic modeler 155 may use machine learning or the like to identify similar terms that are related, but not exactly the same as the topic (e.g., burgundy vehicle) that corresponds to "red truck", etc.

Meanwhile, a service broker 156 may retrieve audio files from the storage 153 which are associated with a particular topic, and transmit content of the retrieved audio files to one or more subscribers (e.g., software application 161, user device 162, and/or user interface 163). Here, the service broker 156 may transmit a portion, but not all of the transcript that is relevant to the topic (and identified by the topic modeler 155) to the subscriber. As another example, the service broker 156 may transmit the entire call transcript, a link to a recording of the audio (e.g., a URL where the audio can be played, etc.), and the like.

Meanwhile, the recording engine 157 may receive queries that are input via a user interface 170, analyze the text files from the calls that are stored in the storage 153 based on the queries, identify patterns of activity that is observed in the calls, and output identifiers of such patterns of activity, insight, etc., via a user interface 170. In some embodiments, the reporting engine 157 may analyze call logs, text files, etc., from across a plurality of different PSAPs/jurisdictions, to identify patterns that persist from the data as a whole. This provides the reporting engine 157 with the ability to detect patterns of information that might not be detectable from call activity of a single PSAP. Furthermore, the reporting engine 157 may output information about the detected patterns via a user interface 170 or other software, display, etc.

Figure 2A:
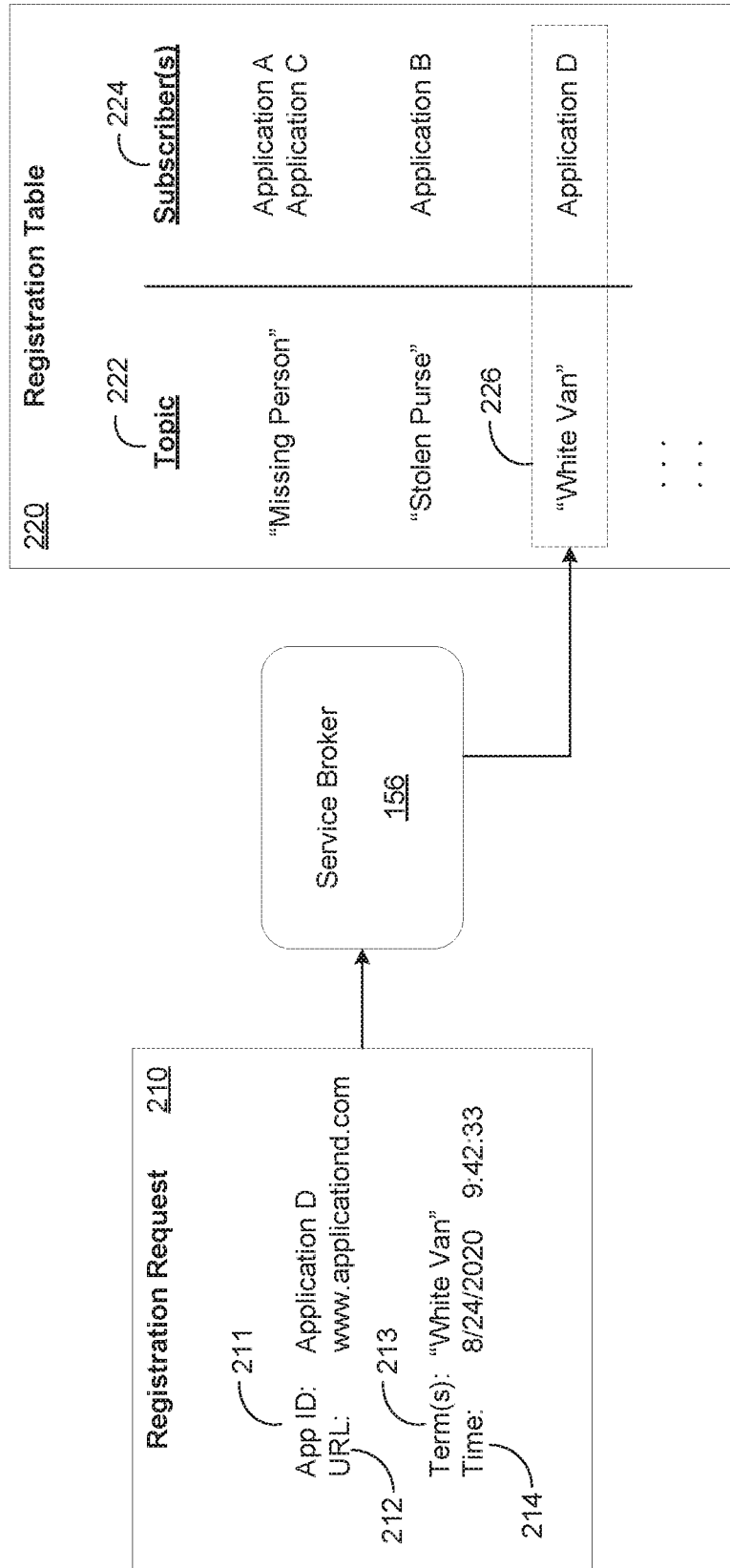
FIG. 2A is a diagram illustrating a process of registering for a topic according to example embodiments.

FIG. 2A illustrates a process 200A of a software process (not shown) registering for a topic according to example embodiments. Referring to FIG. 2A, a software process (e.g., software application 161 shown in FIG. 1B, etc.) may transmit a registration request 210 to the host platform 150. Here, the service broker 156 may receive the registration request 210 and register the subscriber in a registration table 220 that is maintained by the service broker 156 in the storage 153. In this example, the registration request includes an application ID 211, a URL for publishing content 212, a topic 213, and a timestamp 214. However, it should be appreciated that the registration request 210 may include different and/or additional information than shown in the example of FIG. 2A.

The registration table 220 may include various data items such as a column for topics 222 and a column for subscribers 224. Although not shown, the registration table 220 may also include a column or field for timestamps at when a subscription was received. The service broker 156 may receive the registration request 210 from the software application, extract relevant data values from the registration request 210 (e.g., application ID 211, URL, 212, topic 213, timestamp 214, etc.) and store the information as an entry 226 in the registration table 220. Furthermore, in an embodiment where the registration table 220 also includes a value for the timestamp at when the registration request was received, the service broker 156 may perform an aging process to identify subscriptions that are older than a predetermined amount of time (e.g., 1 week, 1 month, etc.) and remove those subscriptions from the registration table 220.

Figure 2B:
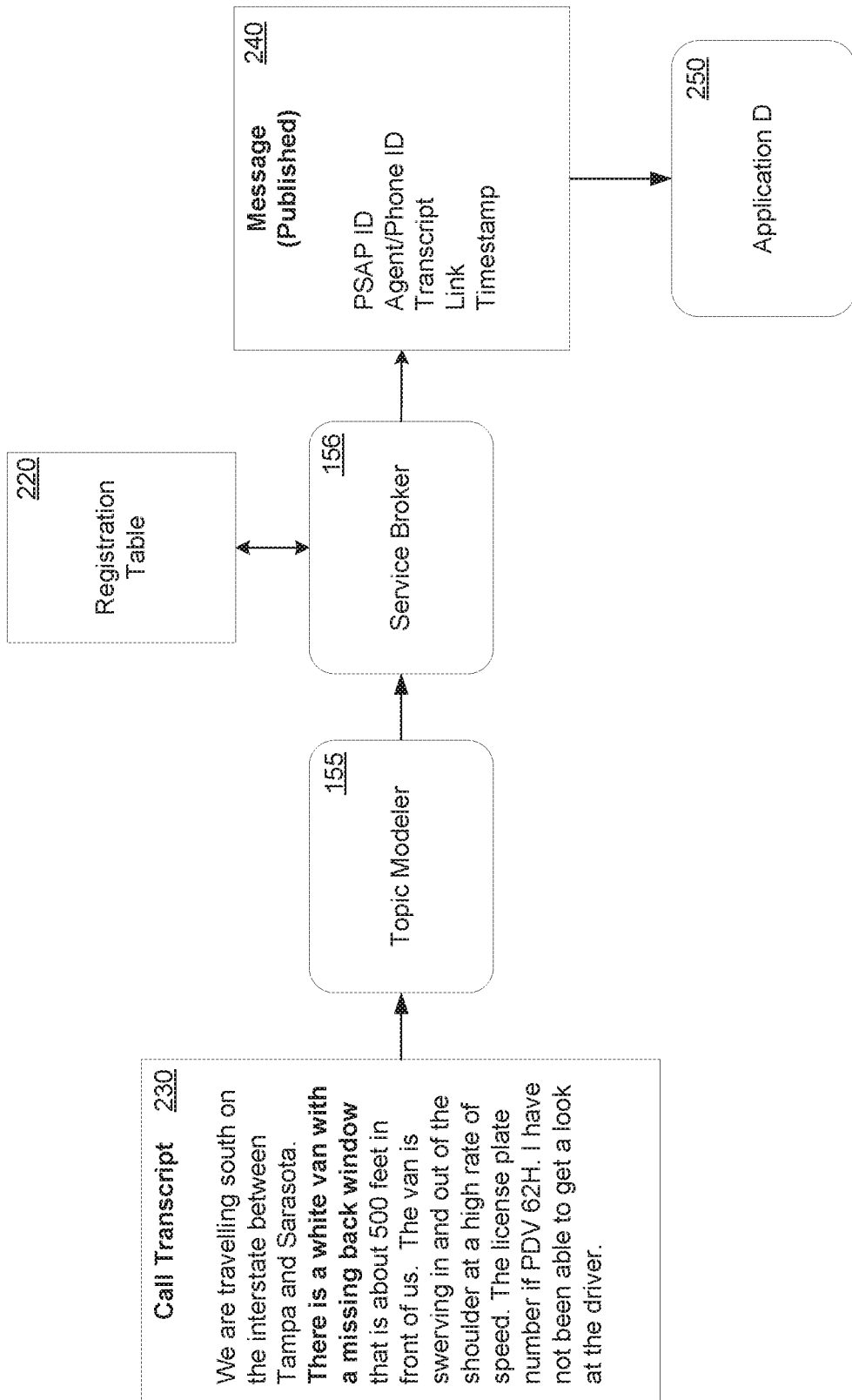
FIG. 2B is a diagram illustrating a process of publishing call content to a registered subscriber according to example embodiments.

FIG. 2B illustrates a process 200B of publishing call content to a registered subscriber 250 according to example embodiments. Referring to FIG. 2B, a call is received at a PSAP and streamed to the host platform (e.g., host platform 150 shown in FIG. 1B) where it is recorded and converted into an audio file that includes a call transcript 230. Here, the topic modeler 155 may analyze the text content within the call transcript 230 for one or more keywords associated with a topic. If the topic modeler 155 identifies the one or more keywords, or enough of the one or more keywords, the topic modeler 155 may determine that the call is associated with a particular topic.

For example, simply finding the term "white van" may cause the topic modeler 155 to determine that the call is associated with the topic white van. As another example though, the topic modeler 155 may also identify non-exact matches such as the term "van" or the term "white vehicle", etc. In this case, a subscriber may provide a level of aggression for the matching such that the topic modeler 155 knows whether to perform an exact match (i.e., not very aggressive) or any similar terms (i.e., more aggressive).

In response to identifying a topic associated with the transcript 230. The topic modeler 155 may inform the service broker 156 which access the registration table 220 and identifies any subscribers (e.g., by their IDs, URLs, etc.) associated with the topic, and forwards content from the call transcript 230 to the subscribers. In the example of FIG. 2B, the service broker 156 identifies the subscriber 250 corresponding to the registered software process in FIG. 2A, and forwards a message 240 to the subscriber 250. In this example, the message 240 includes an identifier of the PSAP (e.g., city, town, state, etc.), a phone number of the caller, a transcript or partial transcript of the call, a link to an audio of the call, a timestamp at which the call was received, and the like.

Figure 2C:
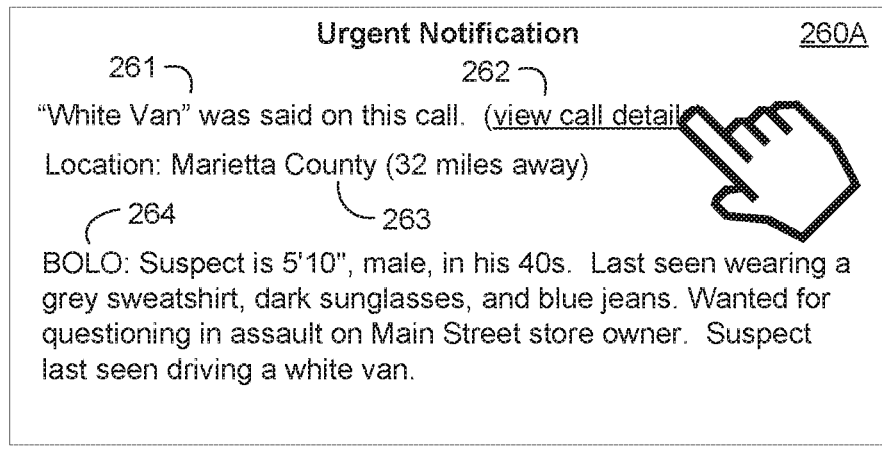
FIG. 2C is a diagram illustrating an output of call content to a subscriber according to example embodiments.
Figure 2C:
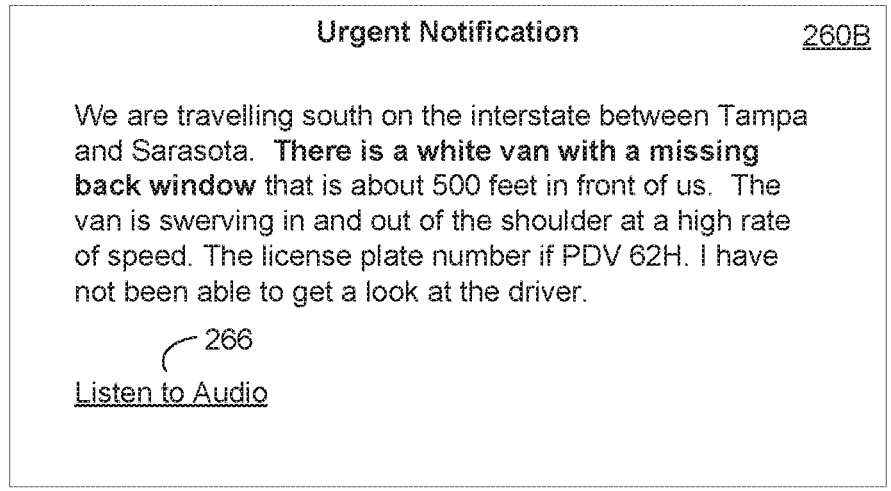

FIG. 2C illustrates some non-limiting examples of an output of call content to a user interface of a computing system of the subscriber 250 according to example embodiments. Here, the output may include an urgent notification 260A which includes a short description or summary 261 of the topic as it was described by the caller and recorded from the PSAP, a link 262 to a transcript of the entire call, a location identifier 263 of the caller, and an identifier 264 of a BOLO that has been placed in association with the topic. When the user uses a cursor to select the link 262 displayed on the urgent notification 260A, the system may output another urgent notification screen 260B which includes the call transcript of the topic, and a link 266 to an audio file (recording) of the call.

Figure 3A:
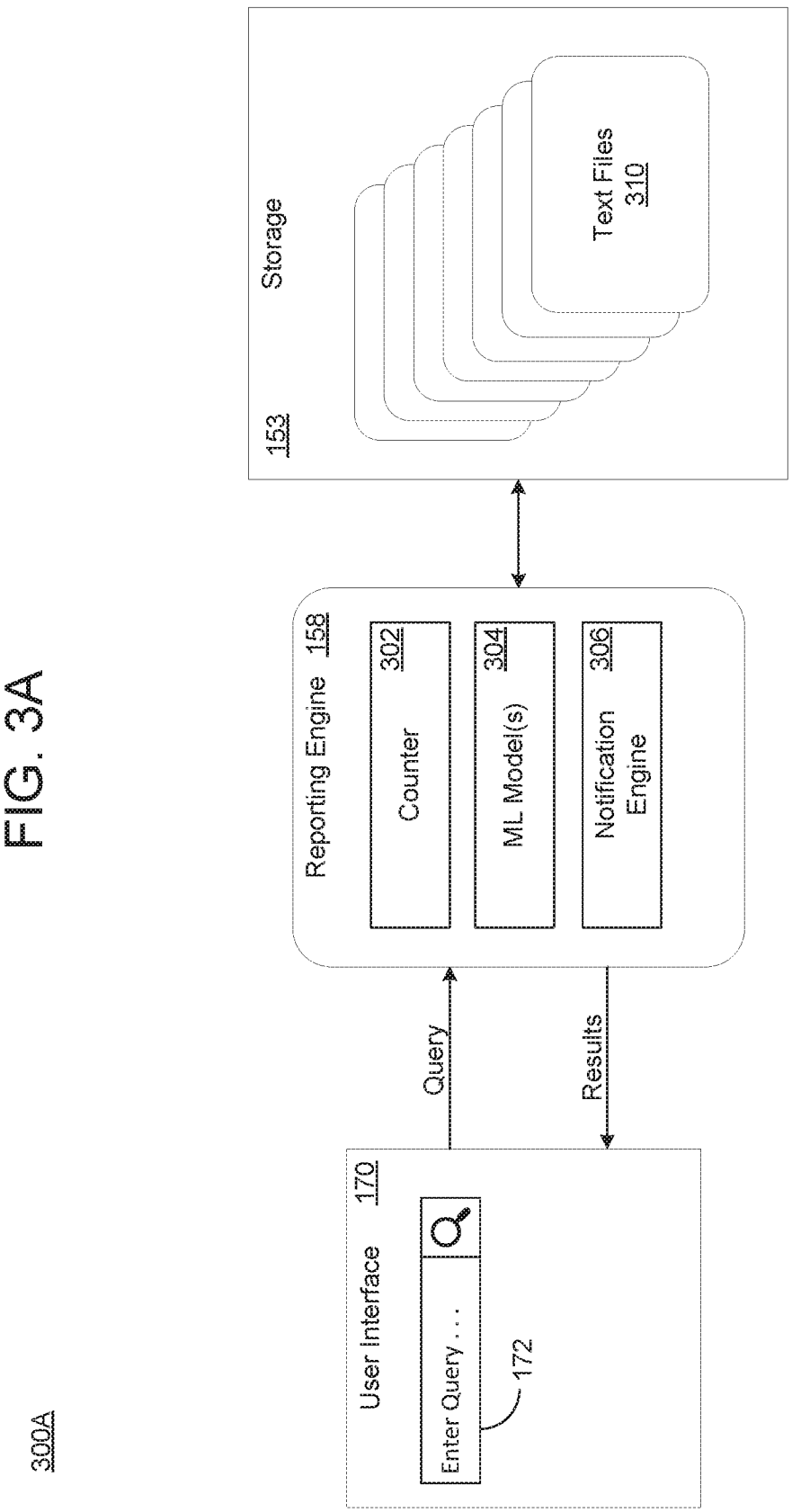
FIG. 3A illustrates a process of querying call content and generating insight according to example embodiments.

FIG. 3A illustrates a process 300A of querying call content and generating insight according to example embodiments. Referring to FIG. 3A, a user may input queries via a search bar 172 of a user interface 170. Here, the query may include one or more words, terms, phrases, etc., that are of interest to a user. For example, a user may input the term "robbery" into the search bar 172. In response, the user interface 170 may transmit a query message to the reporting engine 158. The reporting engine 158 may process the query by searching call content (e.g., audio files 310) which are stored in the storage 153, and which are converted from the audio provided from the PSAPs 141-143, etc. The search query may request information about various observed activities, for example, "homicide", "robbery", "gun violence," "shootings," "domestic disturbances," "automobile theft," "house fires," "ambulance trips," "accidents", "car accidents," and the like.

For example, the reporting engine 158 may include a counter program 302, one or more machine learning models 304, and a notification engine 306. The reporting engine 158 may analyze the call transcripts stored within the text files 310 to identify information related to the search query received from the user interface 170. In this example, the reporting engine 158 may analyze the call transcripts and provide information and insight about the query "robbery" that is input via the search bar 172.

The reporting engine 158 may execute one or more machine learning models in a memory of the host platform. Here, a machine learning model may identify/classify a text file as being related to the query input. For example, a machine learning model may identify patterns of description that are related to the term "robbery." Each query term may have its own respective machine learning model that has been trained based thereon and is stored by the reporting engine 158. As another example, a universal machine learning model may be used to identify any query terms within the text files 310.

Each time a text file is identified as being related to the query input, the reporting engine may store the text file in a temporary memory area of the host platform for further analyzation. The result is a subset of text files that are related to the query input. Furthermore, the reporting engine 158 may analyze the subset of text files that are related to the query input and identify insight from across the different text files. As one example, the reporting engine 158 may identify the number of unique occurrences of the observed activity, which in this example is "robbery." Each time a new unique occurrence is identified, the counter 302 may increment by one. The reporting engine may also use attributes such as geographic locations, timestamps, etc., of the text files, to identify calls that are related to the same occurrence of an activity. In this case, the counter 302 will not be incremented. Thus, the reporting engine 158 can prevent the counter 302 from being incremented when a text file is associated with an occurrence of the observed activity that has already been counted by the counter 302.

After the reporting engine 158 has identified the subset of text files associated with the query input, the reporting engine 158 may generate a short description that identifies the information (e.g., "fifty-seven robberies have occurred since Jan. 1, 2019", etc.) Here, the reporting engine 158 may use a topic modeler to summarize the description. The reporting engine 158 may also use the final counter value to output the total number of occurrences. The notification engine 306 may output the summarized description via the user interface 170. In addition, the notification engine 306 may also output call transcript information, links, etc., which enable the user to further drill-down into the data via the user interface 170.

It should also be appreciated that the reporting engine 158 does not need to receive a query input. As another example, the reporting engine 158 may automatically or periodically provide insight about predefined/observed activities that are of interest. These activities may be managed via the user interface 170 and may be stored for future iterations of the reporting process.

Figure 3B:
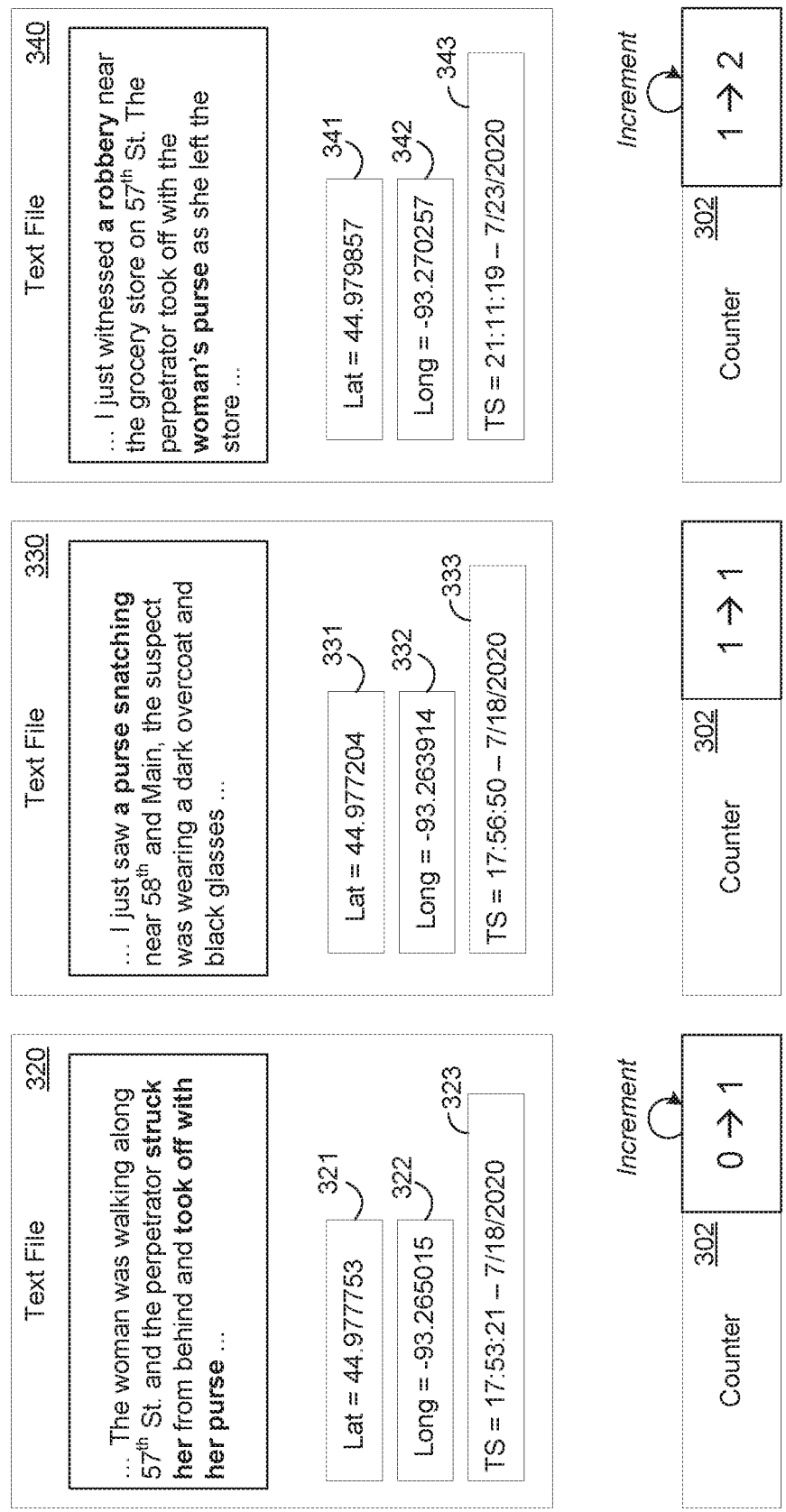
FIG. 3B is a diagram illustrate a process of identifying and accumulating insight from call content across multiple PSAPs according to example embodiments.

FIG. 3B illustrates a process 300B of identifying and accumulating insight from call content across multiple PSAPs according to example embodiments. Referring to FIG. 3B, three text files 320, 330, and 340 are shown. In this example, the reporting engine 158 is attempting to identify information about the search query input "robbery." In this case, the text included in text files 320, 330, and 340 has been identified as being associated with robbery. The reporting engine 158 may also determine a unique count of the occurrences of robbery through the counter 302 which is only incremented upon identifying a unique occurrence of a robbery call (not related to a previously identified robbery call). In this example, the first call corresponding to text file 320 is identified as being associated with a robbery. In this case, the reporting engine 158 may increment the counter value by one.

Meanwhile, the second call corresponding to text file 330 is also identified as being associated with a robbery. In this example, the reporting engine may compare attributes stored within the text files 320 and 330 to determine whether the calls are related to the same robbery incident, or different robbery incidents. In this example, the reporting engine compares geographical coordinates 321 and 322 of a caller of the first call which is stored in the text file 320 and geographical coordinates 331 and 332 of a caller of the second call which is stored in the text file 330 and determines that the location of the two calls is within a predefined distance. However, this may not be enough to determine the two calls are related to the same incident. Therefore, the reporting engine 158 may further analyze timestamps 323 and 333 of the text files 320 and 330 and determine that the timestamps 323 and 333 are within a predetermined range of time (e.g., within a predetermined time from each other).

Based on both of these attributes, the reporting engine 158 determines the two calls correspond to the same incident, and does not increase the counter 302.

Next, the reporting engine 158 analyzes the text file 340 corresponding to a third call that is associated with a robbery. In this case, geographical coordinates 341 and 342 of the third call are within a predetermined distance from the geographical coordinates 321 and 322 of the first call, however, a timestamp 343 of the third call corresponds to a different day and time as the timestamp 323 of the first call. Therefore, the reporting engine 158 determines the third call is a unique call, and increments the counter value 302 again.

Referring again to FIG. 3A, the notification engine 306 may be used to output statistics, descriptions, time periods, and the like, which are related to the search query input. For example, the notification engine 306 may identify the number of unique occurrences of the observed activity (topic), a short description of the topic, a period or range of time searched (e.g., the last 6 months), a geographical area search (e.g., the entire city or a specific neighborhood, etc.), and the like. The output information may be displayed on the user interface 170. As another example, the output information may be output to another application, service, program, or the like.

Figure 4A:
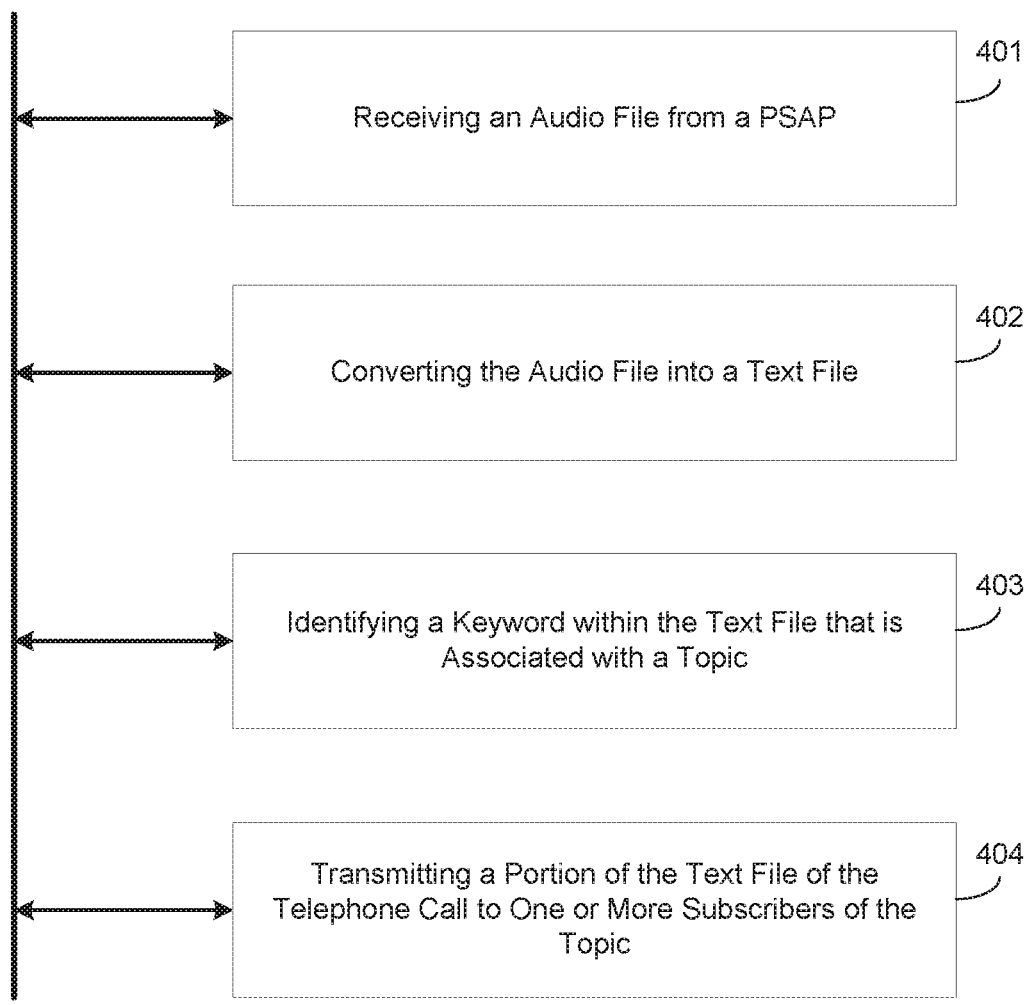
FIG. 4A is a diagram illustrating a method of publishing call content to a subscriber according to example embodiments.

FIG. 4A illustrates a method 400 a method of publishing call content to a subscriber according to example embodiments. For example, the method 400 may be performed by a node within a telephone network such as a gateway, server, router, switch, a cloud platform, and the like. Referring to FIG. 4A, in 401, the method may include receiving an audio file from a public safety answering point (PSAP), the audio file comprising a recording of a telephone call. Here, the audio file may include a live stream of the call as it is being received at the PSAP and uploaded (streamed) to a central host platform such as a cloud, a web server, or the like. The host platform may record the call and store the recording in a storage system.

In 402, the method may include converting the audio file into a text file that comprises a transcript of the telephone call. For example, the speech-to-text converter may include a software application that automatically recognizes text content from audio using automatic speech recognition, computer speech recognition, speech to text, or the like. The speech recognition may include machine learning as well to help improve the accuracy of the speech-to-text recognition. The converted audio may be stored in a text file that is added to the storage system.

In 403, the method may include identifying a keyword within the text file that is associated with a topic. For example, the host platform may identify an exact match to a topic or a similar term(s) or predefined term(s) associated with the topic from the text file and determine that the call corresponding to the text file is associated with the topic. Furthermore, in 404, the method may include transmitting a portion of the text file of the telephone call to one or more subscribers that have registered with the topic.

In some embodiments, the audio file may include a plurality of packets of a Voice over Internet Protocol (VoIP) call between the PSAP and a caller. In some embodiments, the receiving may include receiving a plurality of audio files from a plurality of different PSAPs, converting the audio files into text files, and filtering the text files for one or more keywords associated with the topic. In some embodiments, the receiving may include receiving the audio file from the PSAP via an application programming interface (API) of a cloud platform.

In some embodiments, the method may further include generating a data structure comprising identifiers of a plurality of topics, and identifiers of applications that are registered with the plurality of topics. For example, the data structure may include a registration table or other structure (e.g., index, database object, file, blob, etc.) which includes fields, columns, rows, and the like, of data. In this example, the identifying may further include identifying the one or more subscribers having identifiers that are paired with a topic identifier of the topic within the data structure. In some embodiments, the transmitting may include outputting a display of a portion, but not all, of the text file of the telephone call to the subscriber. In some embodiments, the transmitting may include outputting a link to one or more of the text file and a recording of the telephone call to the subscriber.

FIG. 4B illustrates a method 410 of generating insight from call content according to example embodiments. For example, the method 410 may be performed by a node (e.g., router, server, switch, etc.,) in a call network, a cloud platform, a web server, or the like. Referring to FIG. 4B, in 411, the method may include receiving audio files from public safety answering points (PSAPs), the audio files comprising recordings of telephone calls captured via the PSAPs. Here, the audio files may be streamed to the host platform.

In 412, the method may further include converting, via a speech-to-text converter, the audio files into text files that comprises respective transcripts of the respective telephone calls. The converting may include performing automated speech recognition on the audio files to generate text content recognized from the audio using computer models, machine learning, and the like. The audio files may be stored in individual files or combined into a larger file.

In 413, the method may include identifying, via a reporting engine, a recurring topic that is repeatedly observed among the PSAPs from text content within the text files. Here, the reporting engine may use machine learning, statistical analysis, etc., to identify topics that are repeatedly mentioned within the call content. The machine learning may help to match topics that are not exactly the same (e.g., shooting versus discharge of firearm, etc.) The reporting engine may analyze the call content, identify topics associated with each file, accumulate the amount of calls associated with each topic, identify whether the calls refer to different instance or different instances of the same topic or the same instance, and the like. For example, the reporting engine may detect whether two calls are associated with the same occurrence of a fire or different fires, based on additional information in the call.

In 414, the method may include outputting, via the reporting engine, a descriptive identifier of the recurring topic via a user interface. For example, the outputting may include outputting a description of the particular topic (e.g., four alarm fires in City A), and the number of occurrences (e.g., 57 occurrences) over a predetermined period of time (e.g., the last year). The reporting engine can analyze the call content, accumulate content, keep a counter of each instance, identify whether calls refer to different instances or the same instance, and the like, and output information about the analyzed data to a user interface or a software application.

In some embodiments, the recurring topic may include one or more of an activity that is observed by a caller, a data object that is observed by a caller, and a person that is observed by a caller. In some embodiments, the method may further include initializing a counter value and incrementing the counter value each time a new occurrence of the topic is detected within the text files. In some embodiments, the outputting may further include outputting information about the counter value via the user interface. In some embodiments, the converting may include converting the audio files into unstructured strings of text, and storing the unstructured strings of text in one or more data objects.

In some embodiments, each audio file may include a plurality of packets of a Voice over Internet Protocol (VoIP) call between a respective PSAP and a respective caller. In some embodiments, the method may further include receiving a search request via the user interface for a search term, and in response, identifying text files containing the search term, and outputting information about the identified text files containing the search term via the user interface. In some embodiments, the outputting may include outputting, via the user interface, text content from a text file containing the search term in the search request.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

FIG. 5 is not intended to suggest any limitation as to the scope of use or functionality of embodiments of the application described herein. Regardless, the computing node 500 is capable of being implemented and/or performing any of the functionality set forth hereinabove. For example, the computing node 500 may be a network server of a larger enterprise network that connects multiple user workstations to the Internet, a private network, or the like. As another example, the computing node 500 may be a cloud platform, a database, an on-premises server, a user device, a combination of devices, and the like.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units (processor) 504, a system memory 506, and a bus that couples various system components including the system memory 506 to the processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524 (which may be referred to herein as an output and/or an input). Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus in a communication network, the apparatus comprising:
   a memory that stores a program; and
   a processor configured to execute the program to receive an audio file from a public safety answering point (PSAP), the audio file comprising a recording of a call,
convert the audio file into a text file that comprises a transcript of the call,
identify a keyword within the text file that is associated with a topic,
transmit a portion of the text file to one or more subscribers that have registered with the topic, and
generate a data structure comprising identifiers of a plurality of topics.

2. The apparatus of claim 1, wherein the audio file comprises a plurality of packets of a Voice over Internet Protocol (VoIP) call between the PSAP and a caller.

3. The apparatus of claim 1, wherein the processor is configured to:
receive a plurality of audio files from a plurality of different PSAPs,
convert each audio file of the plurality of audio files into a text file, and
filter the text files for the keyword.

4. The apparatus of claim 1, wherein the processor is configured to receive the audio file from the PSAP via an application programming interface (API) of a cloud platform.

5. The apparatus of claim 1, wherein the processor is configured to output a display of a subset of the text file of the call to the one or more subscribers.

6. The apparatus of claim 1, wherein the processor is configured to output a link to one or more of the text file or a recording of the call to the one or more subscribers.

7. A method, comprising:
receiving, by an apparatus in a communication network, an audio file from a public safety answering point (PSAP), the audio file comprising a recording of a telephone call;
converting the audio file into a text file that comprises a transcript of the call;
identifying a keyword within the text file that is associated with a topic;
transmitting a portion of the text file to one or more subscribers that have registered with the topic; and
generating a data structure comprising identifiers of a plurality of topics and identifiers of applications that are registered with the plurality of topics.

8. The method of claim 7, wherein the audio file comprises a plurality of packets of a Voice over Internet Protocol (VoIP) call between the PSAP and a caller.

9. The method of claim 7, wherein the receiving comprises:
receiving a plurality of audio files from a plurality of different PSAPs;
converting each audio file of the plurality of audio files into a text file; and
filtering the text files for the keyword.

10. The method of claim 7, wherein the receiving comprises:
receiving the audio file from the PSAP via an application programming interface (API) of a cloud platform.

11. The method of claim 7, wherein the transmitting comprises:
displaying a subset of the text file of the call to the one or more subscribers.

12. The method of claim 7, wherein the transmitting comprises outputting a link to one or more of the text file or a recording of the call to the one or more subscribers.

13. A non-transitory, computer-readable medium comprising one or more instructions that, when executed by a processor of a host system, cause the processor to perform operations comprising:
receiving an audio file from a public safety answering point (PSAP), the audio file comprising a recording of a call;
converting the audio file into a text file that comprises a transcript of the call;
identifying a keyword within the text file that is associated with a topic;
transmitting a portion of the text file to one or more subscribers that have registered with the topic; and
generating a data structure comprising identifiers of a plurality of topics and identifiers of applications that are registered with the plurality of topics.

14. The non-transitory, computer-readable medium of claim 13, wherein the audio file comprises a plurality of packets of a Voice over Internet Protocol (VoIP) call between the PSAP and a caller.

15. The non-transitory, computer-readable medium of claim 13, wherein the receiving comprises:
receiving a plurality of audio files from a plurality of different PSAPs;
converting each audio file of the plurality of audio files into a text file; and
filtering the text files for the keyword.

16. The non-transitory, computer-readable medium of claim 13, wherein the receiving comprises:
receiving the audio file from the PSAP via an application programming interface (API) of a cloud platform.

17. The apparatus of claim 1, wherein the processor is configured to identify the one or more subscribers having identifiers paired with respective identifiers of the plurality of topics.

18. The method of claim 7, further comprising:
identifying the one or more subscribers having identifiers that are paired with respective identifiers of the plurality of topics.

19. The non-transitory, computer-readable medium of claim 13, the operations further comprising:
identifying the one or more subscribers having identifiers that are paired with respective identifiers of the plurality of topics.

* * * * *